(12) United States Patent
Harding et al.

(10) Patent No.: US 7,328,519 B2
(45) Date of Patent: Feb. 12, 2008

(54) MACHINE ADAPTATION

(75) Inventors: Andrew James Harding, Bristol (GB); David Kenneth Thomas, Thornbury (GB); Timothy Donald Hayter, Wotton-under-Edge (GB)

(73) Assignee: Renishaw PLC, Wotton-Under-Edge (GB)

( * ) Notice: Subject to any disclaimer, the term of this patent is extended or adjusted under 35 U.S.C. 154(b) by 97 days.

(21) Appl. No.: 10/577,430

(22) PCT Filed: Oct. 28, 2004

(86) PCT No.: PCT/GB2004/004558

§ 371 (c)(1),
(2), (4) Date: Apr. 27, 2006

(87) PCT Pub. No.: WO2005/051595

PCT Pub. Date: Jun. 9, 2005

(65) Prior Publication Data
US 2007/0068025 A1 Mar. 29, 2007

(30) Foreign Application Priority Data
Oct. 30, 2003 (GB) .................................. 0325353.1

(51) Int. Cl.
G01B 5/00 (2006.01)

(52) U.S. Cl. .......................................... 33/561; 33/559
(58) Field of Classification Search ................. 33/556, 33/558, 559–561, 832
See application file for complete search history.

(56) References Cited

U.S. PATENT DOCUMENTS

| 4,158,319 A | 6/1979 | Blockley et al. |
| 4,339,714 A | 7/1982 | Ellis |
| 4,536,661 A | 8/1985 | McMurtry |
| 5,109,223 A | 4/1992 | Schmitt et al. |
| 5,791,836 A | 8/1998 | Feufel |
| 6,922,904 B2 * | 8/2005 | Groell et al. .................. 33/558 |

FOREIGN PATENT DOCUMENTS

| EP | 1 114 693 A2 | 7/2001 |
| WO | WO 03/089188 A1 | 10/2003 |

* cited by examiner

*Primary Examiner*—Yaritza Guadalupe-McCall
(74) *Attorney, Agent, or Firm*—Oliff & Berridge, PLC

(57) ABSTRACT

Transmission of power and/or signal across a machine tool spindle shank is disclosed. Contacts (340) on the shank are connectable to tracks (24/22) on the spindle (210). A circuit (e.g. FIG. 15) is used to determine the orientation of the contacts relative to the tracks when the shank is inserted in an unknown orientation into the spindle.

13 Claims, 11 Drawing Sheets

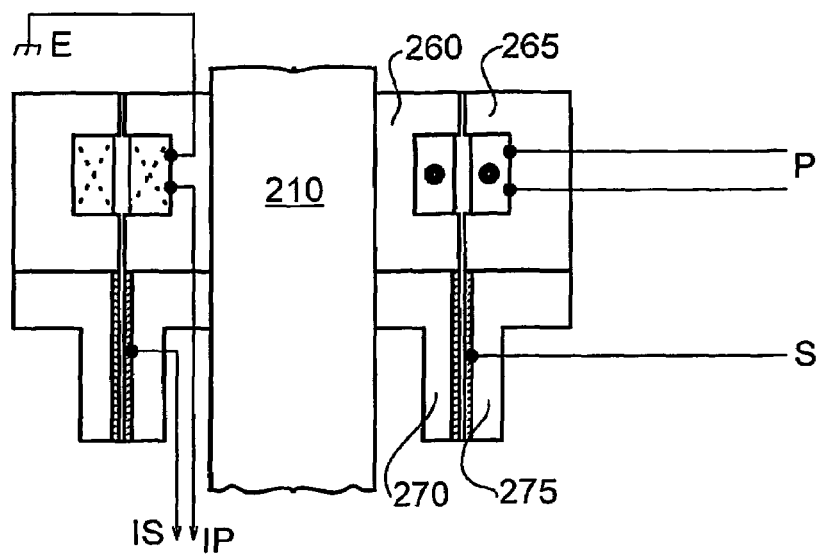
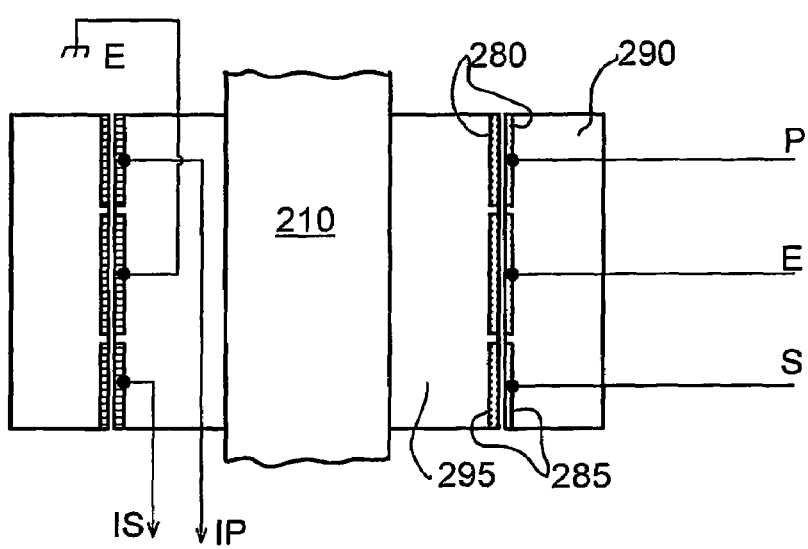
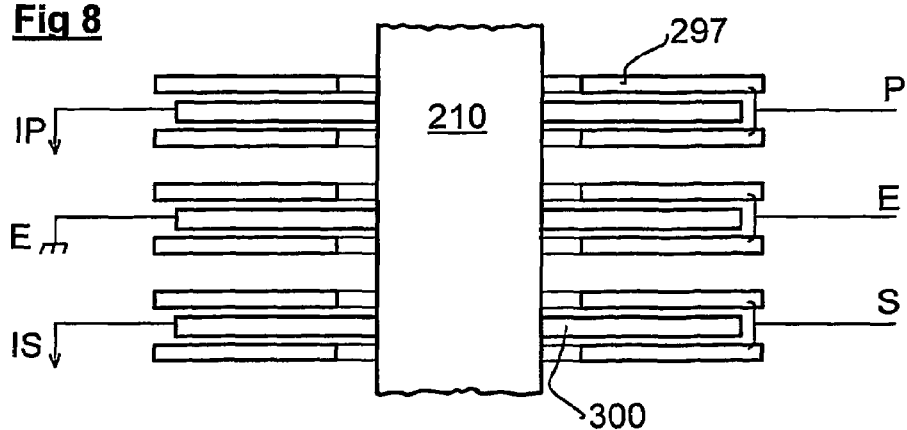

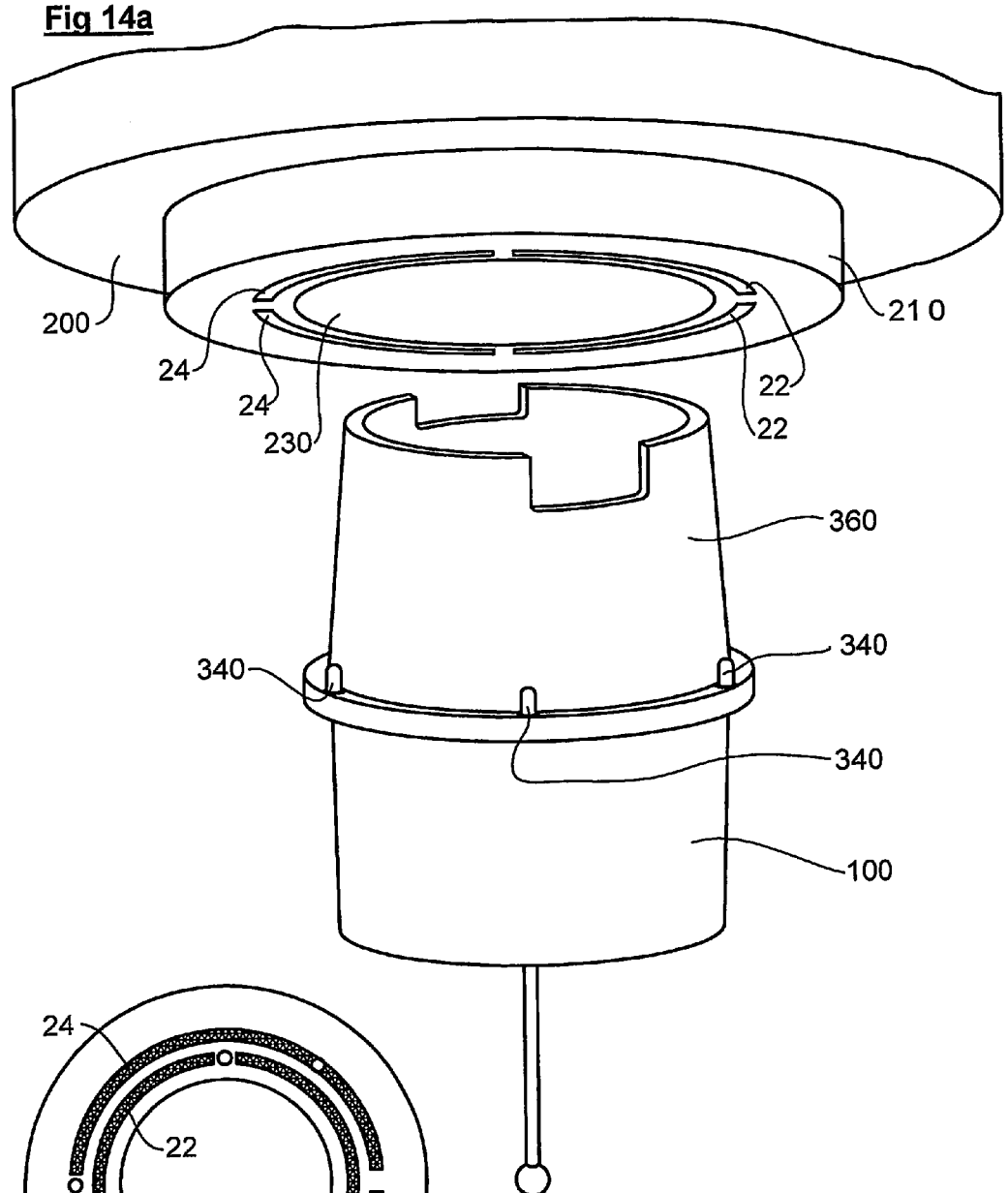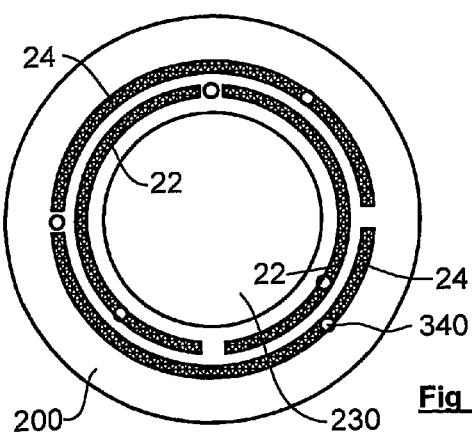

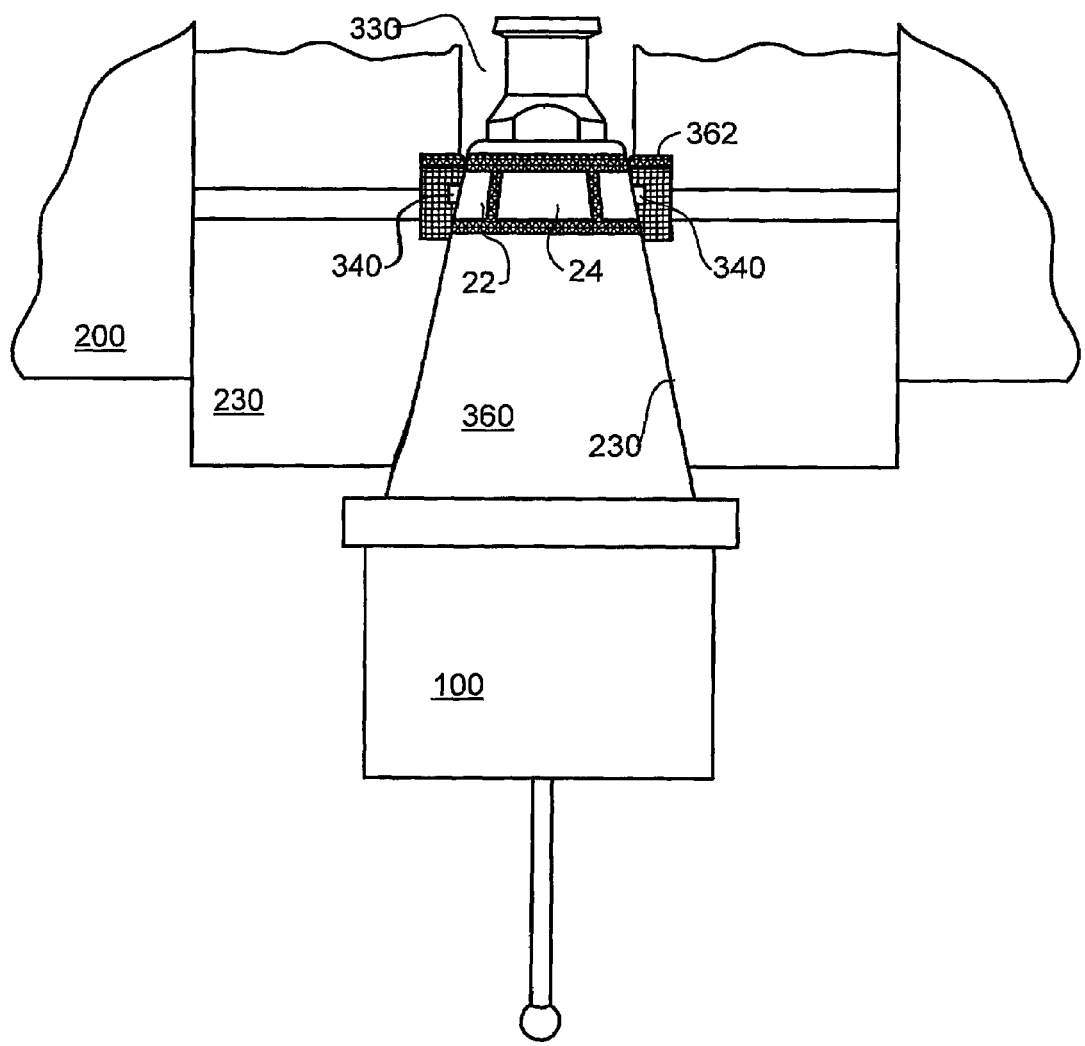

MACHINE ADAPTATION

This invention relates to the transmission of power and/or data within a machine e.g. a machine tool, and relates particularly, but not exclusively, to apparatus for the supply of power to and data communication with an electrical accessory e.g. a measurement probe mounted on the machine spindle.

When an electrical accessory like a measurement probe is located in a machine tool spindle, normally used for cutters, it becomes difficult to supply that accessory with power and to provide a signal path to and/or from that accessory. Batteries have a limited life, particularly when wireless transmission of large amounts of probing data to a remote receiver takes place. Also it is undesirable to have extra power supply or data transmission parts fitted around the machine's spindle because these parts can interfere with cutters subsequently located in the spindle, or these parts may collide with a workpiece or automatic cutter changer mechanism.

One example of a machine which includes parts fitted around the spindle for supplying power to and signal transmission from the machine is shown in U.S. Pat. No. 4,339,714. Other similar devices are shown in U.S. Pat. Nos. 5,791,836 and 4,536,661.

An arrangement for providing a signal path within a machine tool is disclosed in U.S. Pat. No. 5,109,223. The disclosure shows a machine tool body having a signal path to a rotatable spindle in the form of a first inductive link. Also shown is a second inductive link between the spindle and a measurement probe across the widest portion tapered shank (5). A probe is mounted to the shank.

The arrangement of the second link in that patent is not suited to modern machine tools because the wide area at the base of the taper is highly stressed when cutters are being used, due to e.g. high cutter side loading and high spindle speeds. The position of this second link means that it is likely to be knocked by cutter shanks being inserted and removed from the shank holder. Thus it would be difficult for a machine tool manufacturer to successfully adapt his existing machine design to incorporate the arrangement illustrated. Likewise a new design would require additional strengthening to compensate for the weakness created by the second inductive link illustrated.

Furthermore the links will not transmit enough power if they are too small. So it seems that it is a necessity to position the second link at the larger end of the tapered shank in order to maximise its size. Moreover, use on small tool shanks (30 mm diameter or less say) would not be a practical proposition because the link at the shank would be far too small to transmit enough power.

For an inductive link to function effectively the ferrite elements mentioned in U.S. Pat. No. 5,109,223 should not be separated by magnetisable material (e.g. the metal surface of the shank). Consequently an interruption in the surface of the shank would have to be made at the link on the shank for effective operation. Such an interruption would have to be sealed. Sealing of non-metallic parts to metallic parts is very difficult in the machine tool operating environment at the stressed position indicated in FIG. 1 of U.S. Pat. No. 5,109,223.

The arrangement of FIG. 1 in that document requires relative orientation between the tool shank and the spindle. Such orientation is not always possible on machine tools. The arrangement of FIG. 2 requires an annular recess in the shank at the aforementioned highly stressed location.

The transmission of power to the probe is not contemplated in U.S. Pat. No. 5,109,223.

Embodiments shown in International Patent Application No. PCT/GB2003/001677 address the above problems but do not show the following.

According to the present invention there is provided a machine tool accessory including a shank for releasably attaching the accessory to a spindle of a machine tool, the shank being attachable to the spindle in a plurality of orientations and having electrical contacts for electrical communication with complementary electrical contacts at the spindle, the accessory further including a circuit for determining the orientation of the contacts of the shank relative to complementary contacts at the spindle.

In this description an electrical contact is any part which provides physical conductive contact and thus produces a conductive path across a link for electricity. The first link is described as the first element in the description and the second link is described as the third element.

The invention extends to a machine tool shank for releasably mounting a machine tool cutter or other machine tool accessory to the spindle of a machine tool comprising a portion of an electrical link in the form of a plurality of electrical contacts arranged such that each is connectable to any one of a plurality of complementary contacts at a shank receiving area of the spindle.

The invention extends a machine tool comprising a stationary part, a spindle having a shank receiving area, a shank releasably acceptable to the shank receiving area in any orientation or a plurality of orientations, relative to the spindle, and a machine tool accessory attached to the shank, and comprising a first electrical link between the stationary part and the spindle and a second electrical link at the shank receiving area being in electrical communication with the first link for providing in use a disconnectable electrical link between the spindle, the shank for providing power or a signal for the accessory, wherein the second link is formed as two portions, one portion being mounted to the spindle the other portion being mounted to the shank, wherein each portion has a plurality of complementary contacts for electrical communication between the two portions, and a circuit for determining which of the plurality of electrical contacts of the one portion is connected to which of the plurality of electrical contacts of the other portion.

The invention extends also to a measurement probe adapted for use with the machine tool or shank mentioned above.

Preferably the links mentioned above are used to supply power to the accessory. Preferably the links are used to transmit signals to and/or from the accessory.

The invention will now be described with reference to the drawings, wherein:

FIGS. 2-11 show various embodiments of apparatus for supplying power to the spindle, and for transmitting data to or receiving data from the spindle;

FIG. 14a shows apparatus for supplying power and receiving/transmitting data from a spindle to an accessory mounted in the spindle;

FIG. 14b shows an alternative arrangement to that shown in FIG. 14a;

FIG. 17b shows a partial plan view of the apparatus shown in FIG. 17a;

FIG. 19 shows a seal arrangement for use with the invention.

Figure 1:
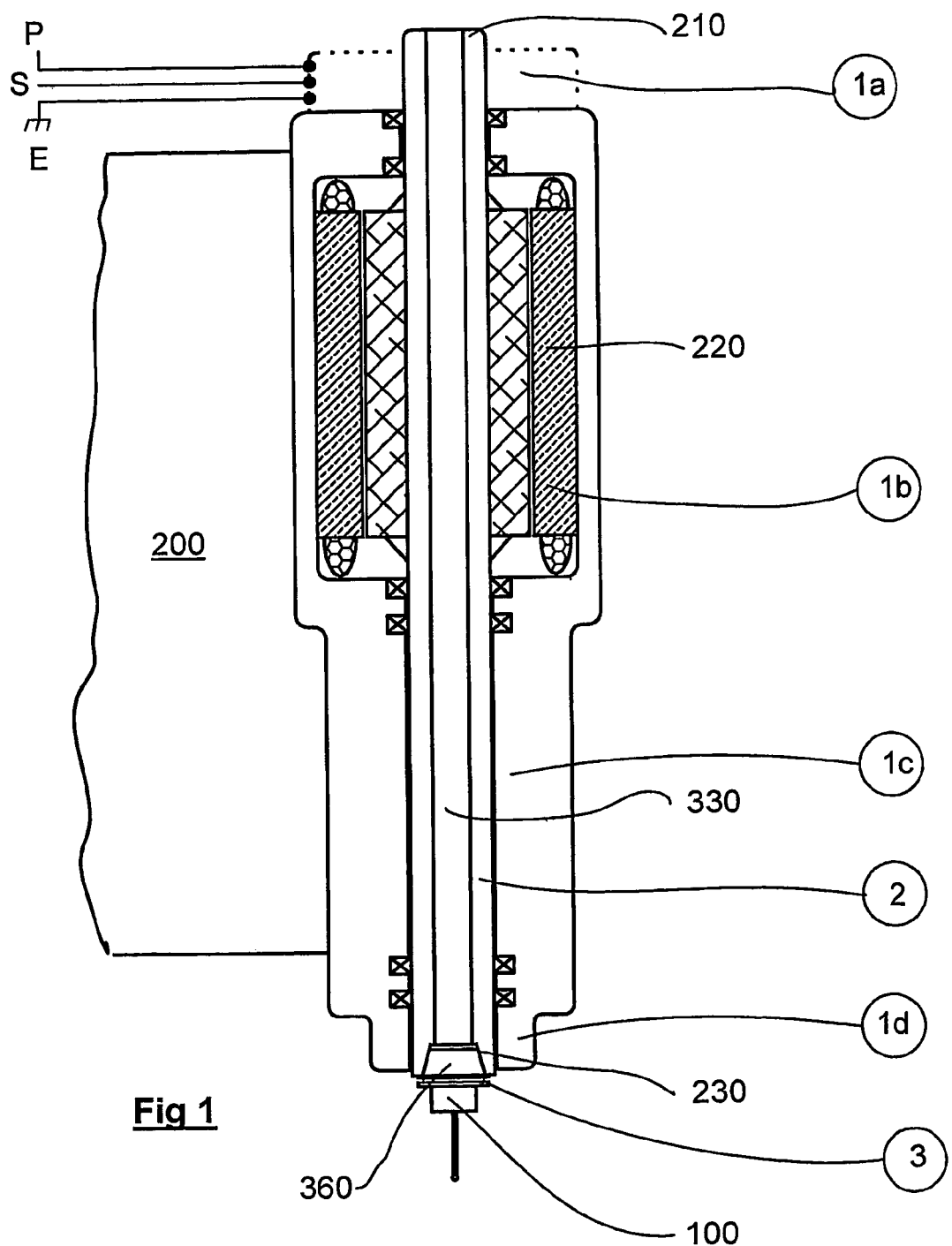
FIG. 1 shows a typical arrangement of a machine tool spindle adapted for the supply of power to, and data transmission both to and from an accessory mounted thereon.

Referring to FIG. 1, part of a machine tool 200 is shown having a spindle 210 driven directly by motor 220. A cavity or shank receiving area in the form of a tapered housing 230 in the spindle 210 is used to hold a cutter or, as in this illustration, a measurement probe 100. Modern machine tools have automatic cutter changers. Other accessories can be used also in place of a cutter. All will be mounted on a standard tool shank 360. Most standard tool shanks are of tapered (frustum) configuration. With this invention a carousel of cutters together with one or more accessories will be used and selection of the correct cutter/accessory will be made by a program. When a measurement operation is to be performed then an accessory in the form of a measurement probe will be selected from the carousel and automatically fitted into the spindle. The machine can be moved into the desired location and the workpiece can be measured, either by translational movement of the spindle or (if the probe itself can move) by keeping the spindle stationary and manipulating the probe.

In order to provide power and a signal path to the measurement probe 100 or other accessory on the machine tool 200 via rotary components (in this case a continuously rotatable spindle 210) three elements are required. The first element is an electrical link between the stationary machine 200 and the spindle 210 for providing power and/or signal connections across a rotary interface, the second is a path along the spindle 210, and the third element is a disconnectable electrical link from the spindle to the probe 100 or other accessory at the shank receiving area 230.

There are a number of positions at which this first element (variants of which are described in detail below) may be positioned, examples of which are shown in FIG. 1 as circled references 1a, 1b, 1c and 1d. Position 1a has been illustrated schematically in chain-dotted lines and provides a rotary link giving a signal path S, power supply P and (in this instance) a chassis return E.

Reference 1b shows another possible position for the first element. In position 1b it is likely that the link between the machine and its spindle will be formed within the motor 220 and take the form of a stator and rotor coil as described below.

References 1c and 1d show other possible positions for the first element which may take the form of any of the links described below with the benefit of complete enclosure.

Reference 2 indicates the second element i.e. the power and signal path along the spindle joining the first and third elements. Alternative embodiments for this part are described below.

Reference 3 likewise indicates the position of the third element i.e. the link between the spindle 210 and probe 100 or other accessory. Alternatives for this part are described below also.

FIGS. 2-11 show various ways of providing power and signal links from the static machine 200 to a rotating part, in this case spindle 210.

Figure 2:
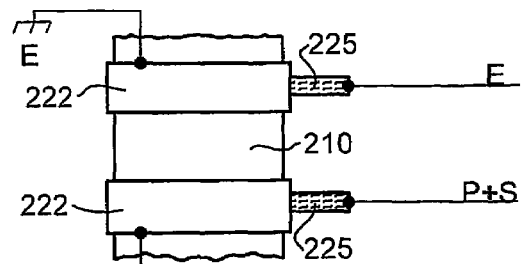

FIG. 2 shows a slip ring arrangement having two rings 222 and two wipers 225, one supplying power combined with a signal (P+S) and one forming a common return E. The power and signal supply is intended to be transmitted via an insulated path I along the spindle and the common return E is formed by the remainder of the spindle. Three or more slip rings could be used e.g. for separate power and signal paths.

Figure 3:
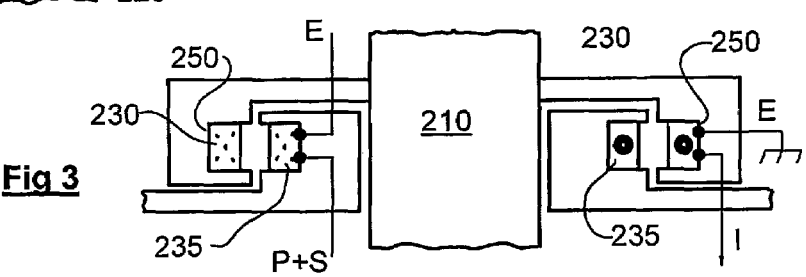

FIG. 3 shows another machine to spindle link in the form of an inductive rotary transformer. In this variant an alternating current is passed through static transformer windings 235 and is picked up by rotary coil 230. One set of windings only is used in this arrangement but more may be used e.g. a pair of sets. In the present arrangement the power and signal P and S are combined in one alternating current sent to accessory 100 via insulated spindle track I, and returned via spindle path E. This rotary transformer is more robust when very high spindle speeds are used e.g. 50,000 rpm, because the coils of the transformer will be pushed centrifugally against side walls 250 in use. These walls will support the coils during rotation.

Figure 4:
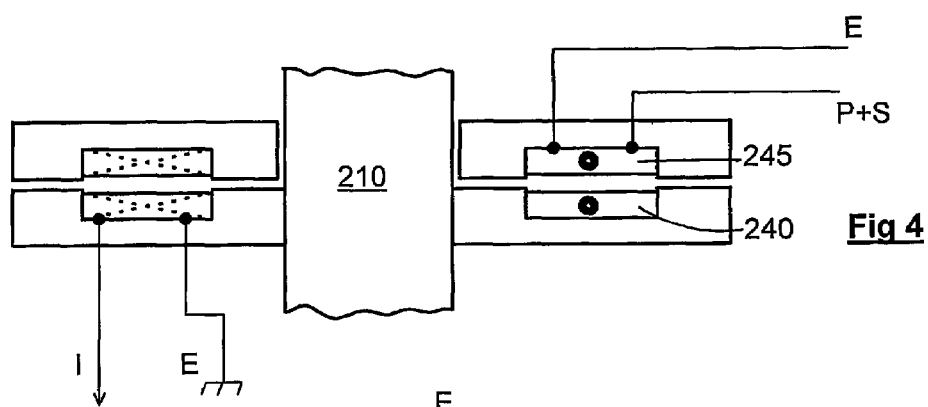

FIG. 4 shows another machine to spindle link in the form of a single coil rotary transformer which has an axially spaced stator 245 and rotor 240. This arrangement operates in a similar manner to the rotary transformer shown in FIG. 3.

Figure 5:
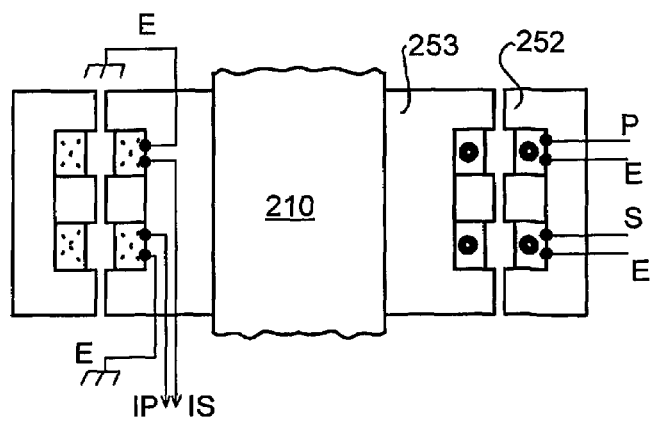

FIG. 5 shows a machine to spindle inductive link in the form of a multiple coil rotary transformer having rotary and stationary parts 252 and 253 respectively. In use a separate power and signal path can be utilised, in which case two insulated paths IP and IS will be required on the spindle. A common spindle return E is used here.

FIG. 6 shows another machine to spindle link this variant employs a rotary transformer having a stator 265 and a rotor 260 in combination with a capacitance link which likewise has a stator part 275 and a rotor part 270. A signal S is passed via the capacitance link and power is supplied via the rotary transformer. The spindle has two insulated paths IS and IP and a common return E.

FIG. 7 shows a machine to spindle link which is solely capacitive. A stator 290 is shown and a rotor 295. In this example there is a power path P-IP and a separate signal path S-IS as well as a common return E. The power path will have to have a relatively high capacitance and so the surface area of the capacitive plates 280 should be larger in comparison to the area of the signal path plates 285.

FIG. 8 shows another capacitive machine to spindle link. This variant has radially extending plates 297/300 to provide more surface area than might be achievable with the circumferentially extending plates illustrated in FIGS. 6 and 7. This example functions in the same manner as the capacitive link shown in FIG. 7 and described above. Shown is a stator 297 and a rotor 300.

Figure 9:
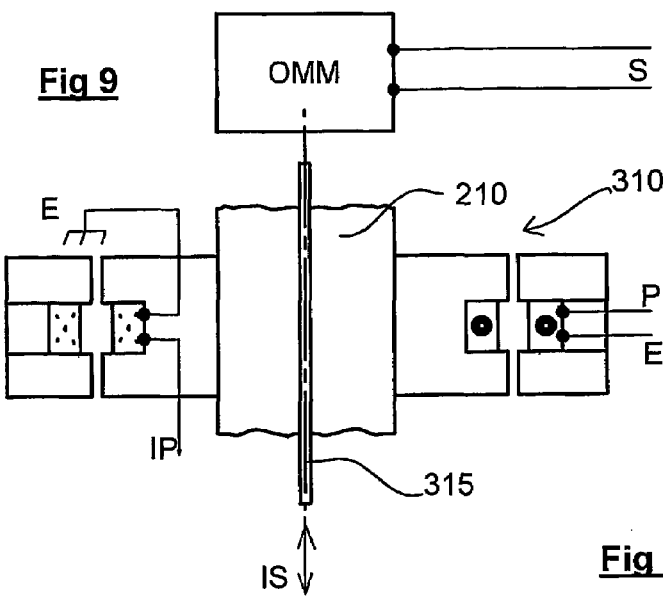

FIG. 9 shows yet another machine to spindle link. In this example a rotary transformer 310 is used for power transmission. A signal path IS is provided by an optical fibre 315 in the spindle co-operating with an optical machine module (OMM). The signal path in the spindle is via the optical fibre 315 which rotates in use. A small gap for light to cross is present between static OMM and rotary parts of the spindle. Thus a rotary link is formed for a signal. An optical transceiver in the spindle or accessory may be provided for two-way communication along the fibre 315.

Figure 10:
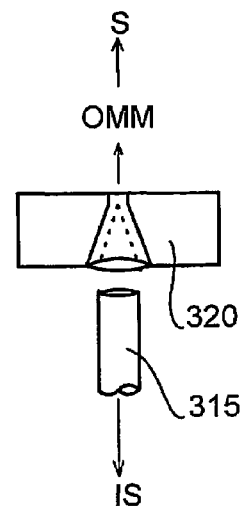
Figure 11A:
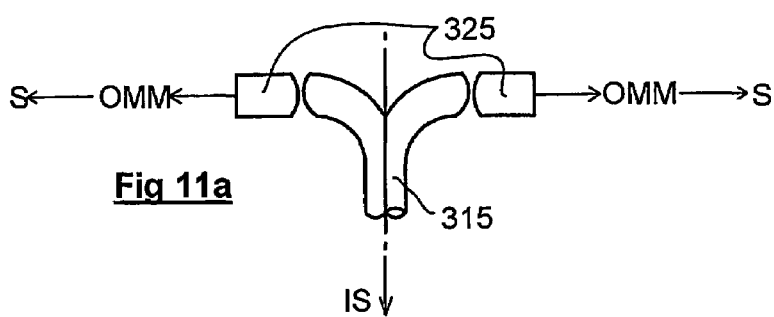
Figure 11B:
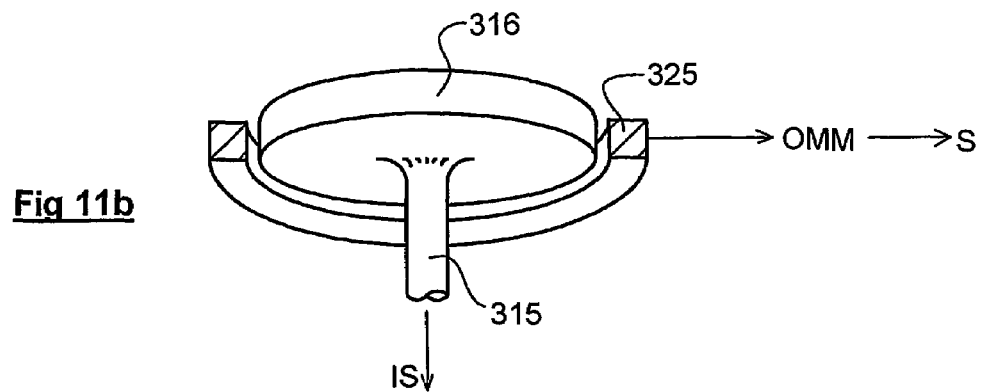

FIGS. 10 and 11 show examples of optical fibre to OMM links. FIG. 10 shows a fibre 315 which can transmit and/or receive data via a static axial emitter/sensor 320. FIG. 11a shows a y-shaped fibre 315 which can transmit and/or receive data via a ring of static emitters/sensors 325 disposed circumferentially about the ends of the y-shaped fibre 315. FIG. 11b shows a fibre 315 merging into a disk 316 which again can transmit and/or receive data via a ring of static emitters/sensors 325.

The electrical link shown in FIG. 2 is a contact link whereas the electrical links shown in FIGS. 3-11b are all non-contact links.

Figure 12:
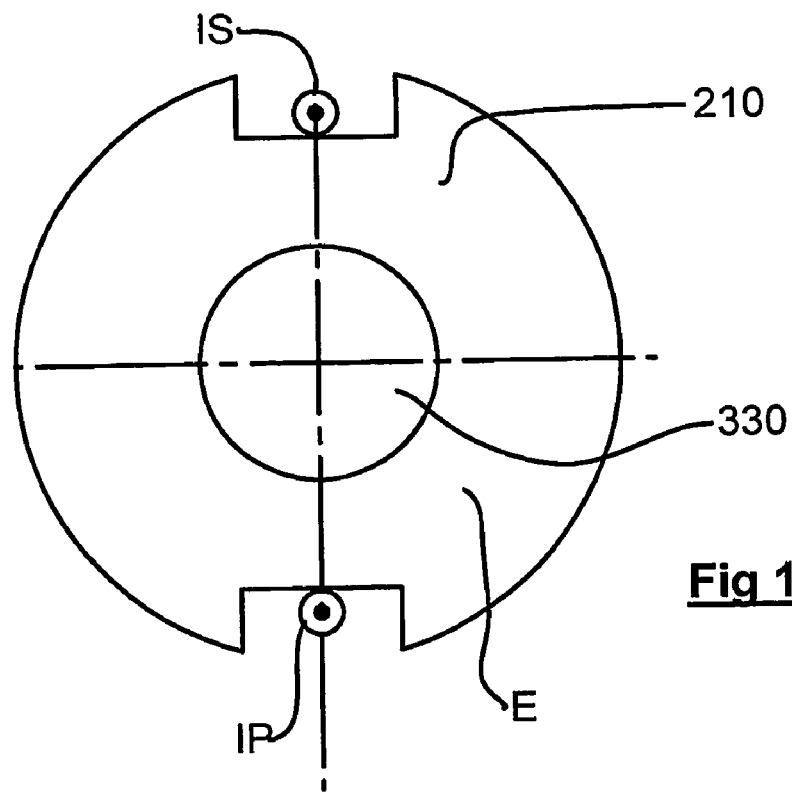
FIGS. 12 and 13 show apparatus for carrying power and signals along a spindle.
Figure 13:
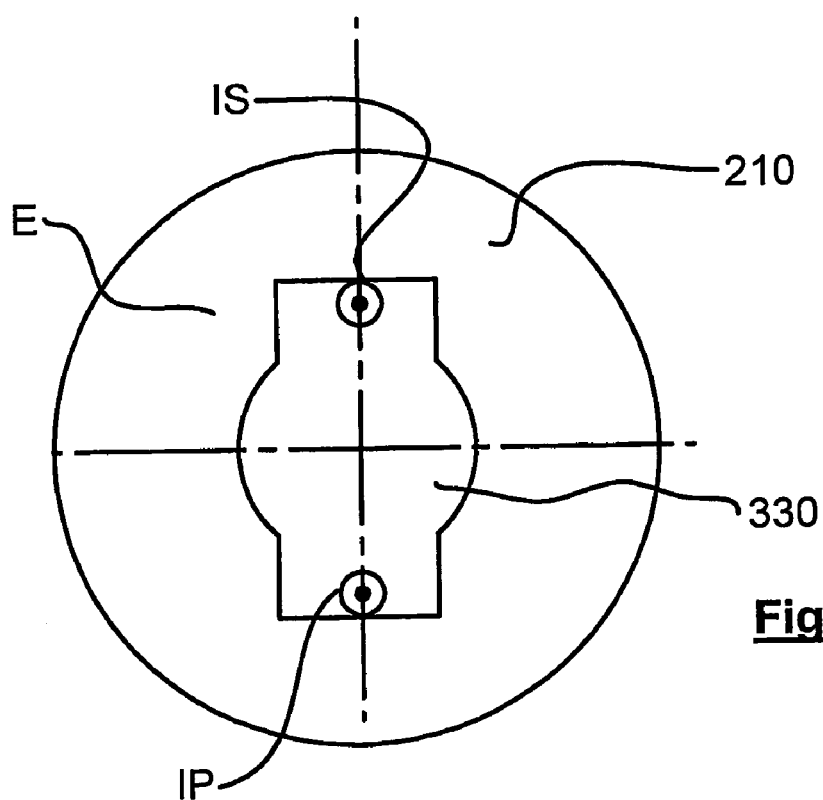

FIGS. 12 and 13 illustrate examples of the second element and show sections through spindle 210, having a draw-bar bore 330. Each FIG. shows two insulated paths IS and IP for signal and power respectively, as well as a common return E formed by the remainder of the spindle. Two wires are used in these examples for dynamic balancing of the spindle. A combined signal and power path might be used so one wire only would then be required. A counterweight or asymmetric section might be used to provide a balanced shaft if only one wire was present. Shown are two insulated wires but more than two wires may be used. Alternatively or additionally one or more optical fibres may form the required signal path. Optical fibres may be omitted entirely, so a straight line light path may be provided between the machine to spindle link and the electrical device.

The electrical paths IS and IP may be formed by any distinct conductive path e.g. by flexible conductive strips possibly in a groove or grooves, or curled up inside the central draw-bar bore 330. The power and signal paths may be formed by an insulated draw-bar, a discrete strip of conductive plating formed on the spindle or draw-bar, or concentric insulated tubes within the spindle or within the draw-bar.

FIG. 14a shows an example of a third element of the invention i.e. the disconnectable link between the spindle and the electrical device.

Probe 100 is attached to the shank 360 which is insertable (usually automatically) into a shank receiving area, in the form of a tapered housing 230 in the end of the spindle 210. Conductive tracks 24 and 22 provide paths for power to and signals to/from the probe 100. The tracks are electrically insulated from their surroundings.

When the shank is inserted into the housing 230 sprung pins 340 on the shank make contact with the tracks and provide the paths for power and signal to the probe. Pins 340 too are insulated from their supporting surroundings. The pins are adjacent the housing 230. FIG. 14b shows an alternative arrangement of tracks 22/24 and pins 340. In this case three pins 340 are provided for each track 22/24.

Figure 15:
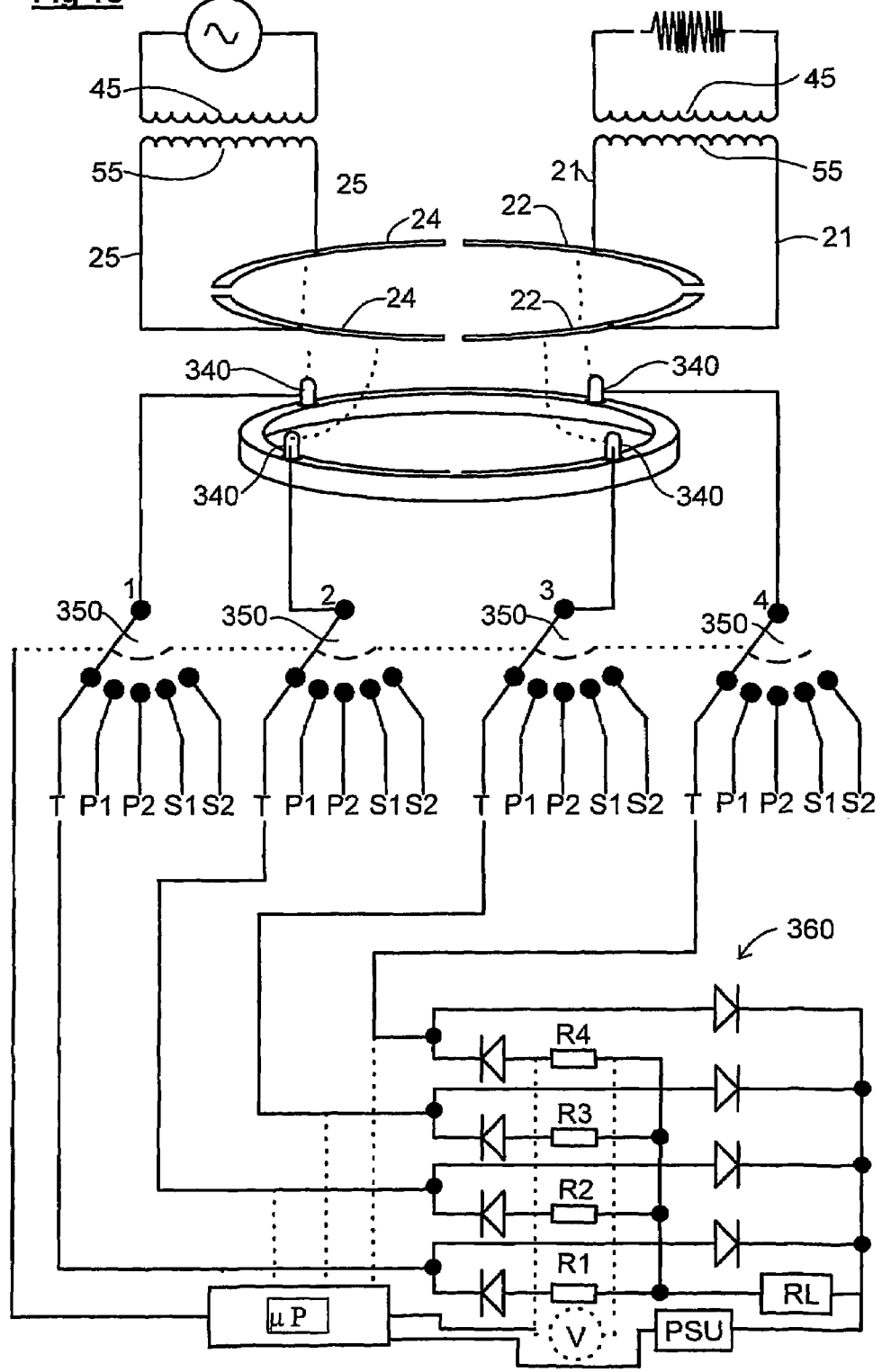
FIG. 15 shows part of the apparatus shown in FIG. 14 and a circuit for determining the orientation of a shank in a spindle.

FIG. 15 shows the supply circuits to the tracks 24 and 22. These circuits are shown in more detail in FIG. 18. The circuits may be powered from the contacts 22/24.

Now, if control of the orientation of the shank relative to the spindle is not possible or the shank is orientatable to two or more positions at random, then the position of the pins relative to the tracks will be unknown or uncertain. To overcome this problem pins 340 are connected to a circuit 360 which will determine which pins are connected to which tracks. The circuit will then switch the pins to supply the correct probe circuits.

Each pin is connected to a multi-way controlled switch 350 (i.e. switch 1,2,3 or 4) in this instance solid state switches, having a test position T and, in this case, four other positions, two for supplying power P1,P2 and two for a signal path S1,S2. The circuit 360 includes a controller, in this instance a microprocessor, which controls the switches 350 and sets each switch 350 to the initial test position T.

In this position a supply of alternating current via tracks 24 will produce a half-wave voltage increase across two of the resistors R1,R2,R3 or R4 on alternate half cycles. The voltage V across each of the resistors is monitored by the microprocessor. The microprocessor switches a first of the switches 1,2,3 or 4 to the P1 position if its corresponding resistor R1,R2,R3 or R4 has a voltage across it. Likewise the microprocessor switches a second of the switches 1,2,3 or 4 to the P2 position if its corresponding resistor R1,R2,R3 or R4 has a voltage across it.

The microprocessor can then switch the remaining two switches to positions S1 and S2.

Figure 16:
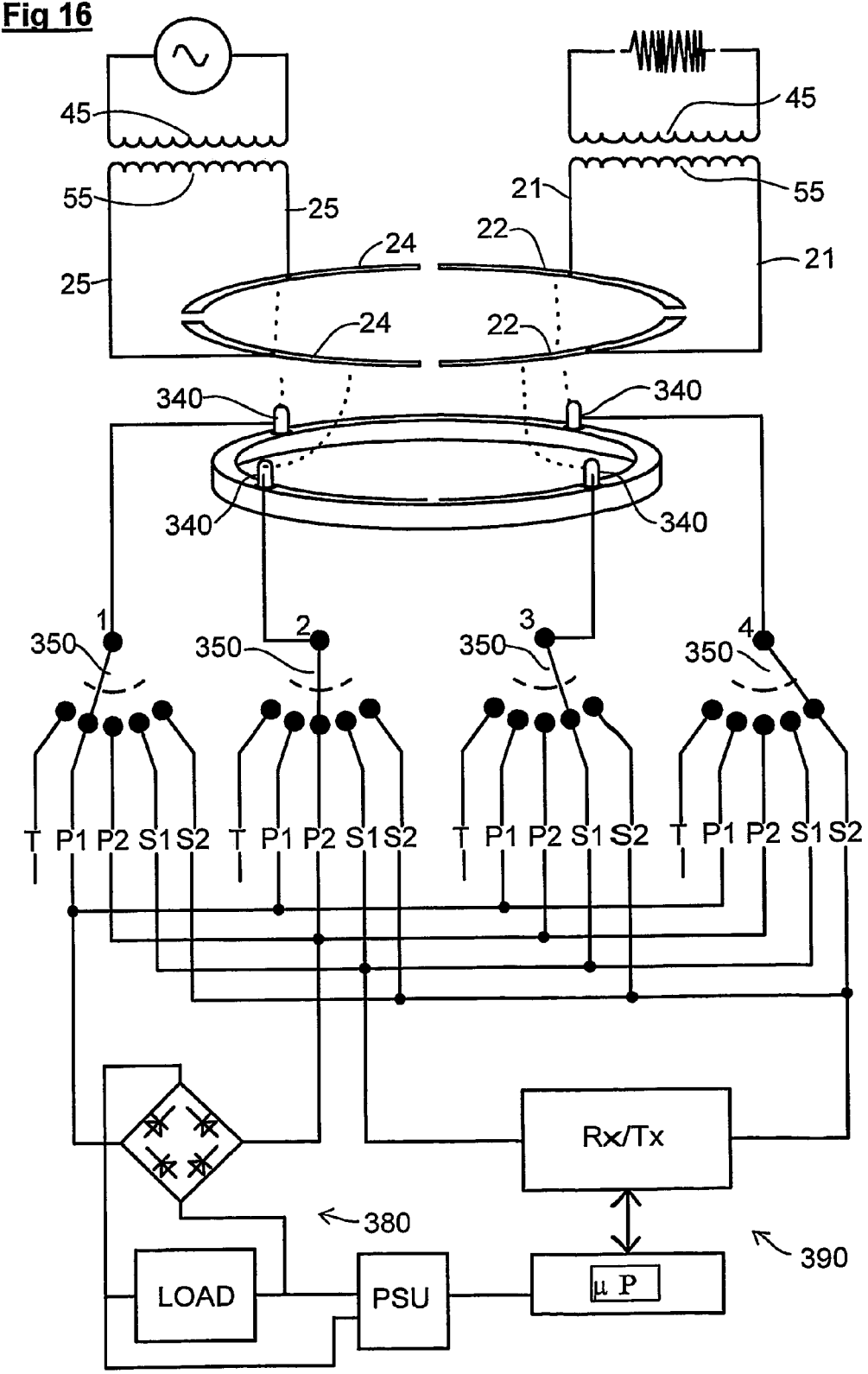
FIG. 16 shows part of the apparatus shown in FIG. 14 and a circuit for inclusion in an accessory which uses power and signal.

FIG. 16 shows a simplified probe circuit in which the switches 350 have been switched correctly by the microprocessor. A load circuit 380 is fed by switches 1 and 2 and a signal path is provided via switches 3 and 4 to a transmitter and receiver circuit 390. In FIG. 15 it will be noted that the electrical connections 24 and 21 are each shown side by side. However, if they were diagonally opposed there would be no need to have a circuit to determine the orientation of the contacts because the contacts would come together such that the orientation is not important.

Figure 17A:
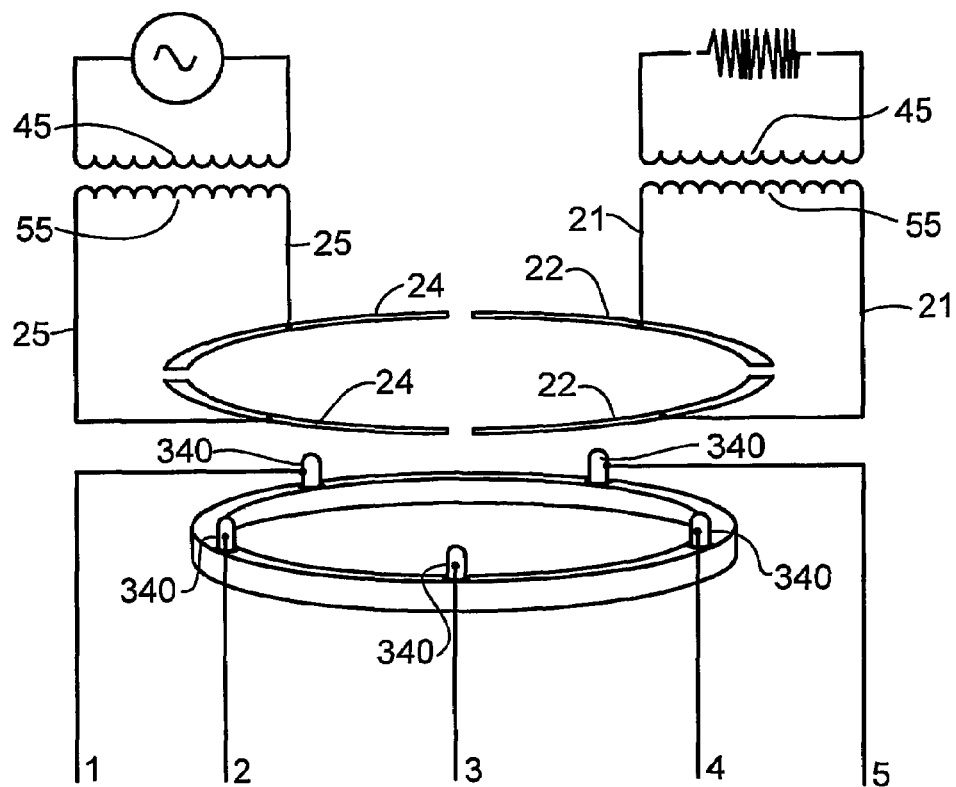
FIG. 17a shows another embodiment of apparatus for supplying power and receiving/transmitting data from a spindle to an accessory.
Figure 17B:
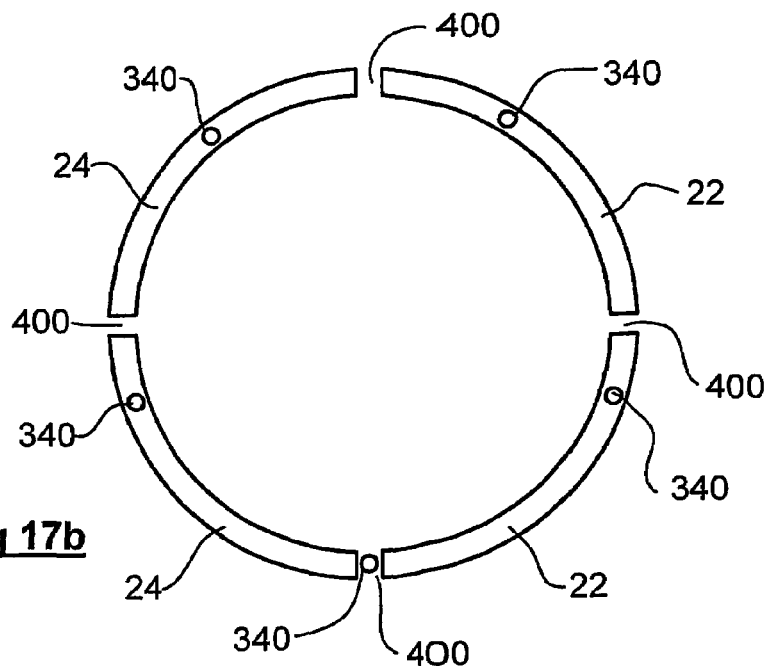

FIG. 17a and 17b show a refinement of the apparatus of FIGS. 15 and 16. Since it may be possible for one or more of the pins 340 shown in FIGS. 15 and 16 to fall into a gap 400 between the tracks 24 e.g. as shown in FIG. 17b then it is better to have five pins 340 1,2,3,4 and 5 as shown in FIGS. 17a and 17b. Then, at least one pin 340 will be in contact with each track 24/22 irrespective of the orientation of the shank 360 relative to the housing 230.

In this refinement the operation of circuit 360 will have to be modified. The circuit will determine which pins are connected to the power supply as before. The microprocessor can then determine which pins have impedance equal to that of the transformer coil 55 between them (indicating connection to the signal path S), which pins have a short between them (indicating two pins on the same track) and which pins are open circuit (indicating no connection-pin in gap 400). Then the microprocessor can switch the switches 350 correctly so the appropriate connections are made to the circuits 380 and 390. The technique described immediately above will work for a plurality of tracks and a plurality of pins. The numbers of tracks and pins need not be the same.

FIGS. 14-17 show sprung pins 340 on a shank 360 and tracks 24/22 on a spindle 210. The position of the pins and tracks could be reversed. Any type of electrical contact could be used in place of the pins and tracks illustrated. Any suitable number of tracks and pins etc could be employed but for simplicity two for power and/or two for signal are preferred on the spindle, mating with five pins or tracks etc mounted on the shank.

Figure 18:
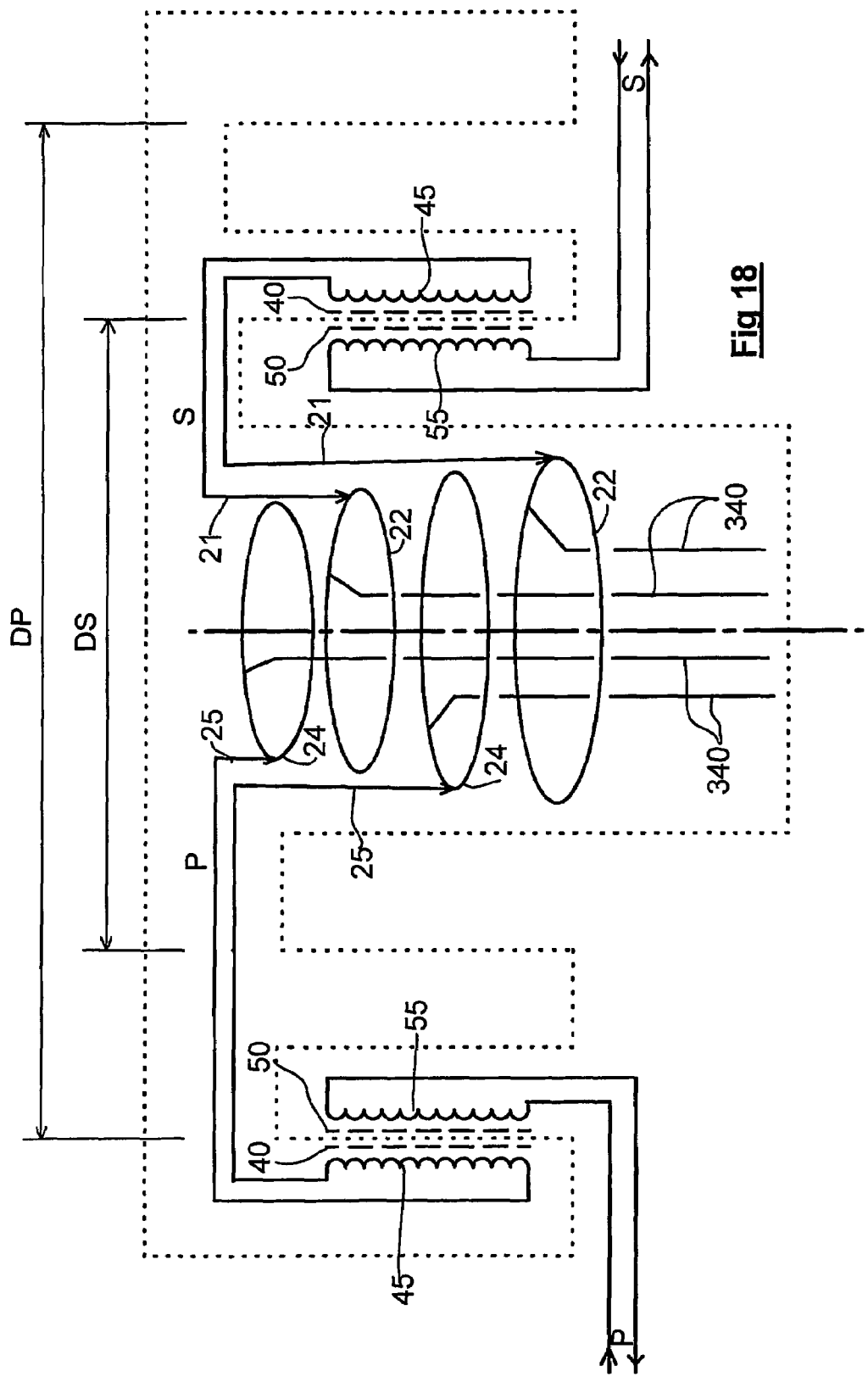
FIG. 18 shows apparatus for supplying power or receiving/transmitting data from a spindle to an accessory mounted at the spindle.

FIG. 18 is a schematic representation of the electrical principle used in the apparatus illustrated in FIGS. 14 to 17b. Two inductive links are used to provide communication between the static housing and the rotating parts of the spindle, one for power and one for signalling (the first element). Shown also are two contact sets 21/22, 24/25 for communication between the spindle and the shank. Rotatable parts of the link are shown within the area bounded by the dotted line. Each inductive link is formed by a closely spaced pair of annular rings 40/50 (FIG. 18), in this case ferrite rings, each of which has a conductor coil 45/55 associated therewith. The ferrite rings and coils together form the non-contact inductive link between the stationary machine 200 and the spindle 210. The ferrite rings and coils may rotate relative to each other. In this embodiment the two sets of ferrite rings/coils have different diameters DP & DS so one set can be positioned within the other. This means that space in the axial direction of the machine can be conserved. The separation between inductive elements has been shown as cylindrical about the rotation axis of the spindle. However separation in a plane perpendicular to the axis is possible.

The contacts illustrated above have to operate in a hostile environment. For example, machine coolant is used and is often forced through the centre of the spindle 330 (FIG. 1). This coolant causes electrical contact problems at the contacts. In order to alleviate this problem a seal may be provided.

FIG. 19 shows a taper shank known as a BT40 shank. Contacts 22 and 24 are arranged around the shank 360. Seal 362 fitted adjacent contacts 340 prevents coolant from the spindle centre 330 from leaking onto contacts 22/24/340. The seal becomes operative when the shank 360 is inserted into the spindle cavity 230. In an alternative arrangement the seal 362 may be fitted to the shank 360.

The advantages of supplying power and/or providing a signal path to a measurement probe via the machine to which it is mounted are:
  that little or no internal power is required in the probe;
  a lack of a battery compartment and transmission module enables the probe to be more compact;
  an operator is not required to change batteries;
  the contact, inductive or capacitive signal links described are less likely to suffer external interference than radio or light data transmission systems used outside the machine's spindle; and
  since no parts external to the machine are used then, when the probe is not in use, there are no residual parts to interfere with the other operations of the machine.

Whilst the invention has been described with reference to its application to a machine tool and measurement probe, it has many other applications and so is not intended to be limited to this field. For example the invention may find use in any machine which is adapted to accept an electrical device at a rotary machine part and which is capable of supplying power or a signal path to or from the device.

Examples of accessories other than probes that may be used with the rotary part described include: a robotic gripper or workpiece manipulator; a laser deburring tool (possibly articulatable); a laser driller/profiler/engraver/surface hardener; a camera e.g. for measuring surface finish or for monitoring tool breakage; adjustable size tooling, workpiece cleaners (e.g. vacuum cleaners); electromagnets; high speed motors (e.g. for deburring use) or a tool having supplemental equipment, such as wear, deflection, breakage, identification, usage recording devices, or temperature, cutting torque or vibration sensing.

Examples of different probes that might be used include: scanning probes e.g. analogue probes or data streaming probes; touch trigger probes; non-contact probes e.g. camera or laser probes or surface texture probes. Additionally probes could be articulated by mounting a movable probe head to the shank mentioned above.

The accessory may include data storage and the data may be read or rewritten. Data stored could include identification and, where a tool and supplemental equipment is used, tool geometry or usage information.

The description and claims refer to a shank. Herein the word shank is intended to embrace any coupling (e.g. male or female) which is suitable for removable coupling of a rotatable part of a machine to an accessory.

There are presently several standard tool shank designs i.e. the part of the tool which fits into the end of a machine tool's spindle. The probe 100 shown in FIGS. 1&14-23 illustrates only two types of shank (HSK & BT40). As a consequence any accessory used in place of the tool e.g. a probe, may require several different shanks to fit all the machines which have spindles adapted to supply power or to carry a signal. Thus a feature of this invention is the shank itself, i.e. coupling between the accessory and the rotatable part of the machine which, whilst illustrated as being a shank integral with the probe in some FIGS. may be a separate item which is selectable from a number of designs to suit the machine on which the accessory is to be used, but which will have the ability to transmit power to the accessory and/or will provide a signal path.

The shanks described herein and illustrated are intended to fit to a machine in use. However they may also be employed off the machine. For example the contacts on the shank may be used to provide pre-heating current for keeping a measurement probe or the like warm whilst it is off the machine, so that no thermally-induced errors in measurement occur. Another example is the uploading of tool data into a tool via the contacts e.g. geometry, tool set information, expected usage, number of teeth etc., before fitment to a machine.

The claims refer to a spindle. Herein the word "spindle" is intended to embrace any continuously rotatable part on a machine tool suitable for rotatably driving and holding a tool.

The word "link" used in the description and claims is intended to embrace all electrical interfaces, serial or parallel, singular or plural path, contact or non-contact.

The signal is preferably transmitted at a frequency of between 1 and 100 MHz. This range results in low losses. The power is preferably transmitted as a.c. at a frequency of more than 20 KHz (approximately 100 KHz being preferred). At this frequency, or greater, little electrolytic corrosion takes place between any contacts used. In order to reduce corrosion on contacts still further, the contacts can be made from Tungsten. Despite the lack of corrosion when using a.c. at a frequency of 20 KHz or above a short pulse of power could be used to remove any corrosion during use, particularly in the signal paths S.

The invention claimed is:

1. A machine tool accessory including a shank for releasably attaching the accessory to a spindle of a machine tool, the shank being attachable to the spindle in a plurality of orientations and having electrical contacts for electrical communication with complementary electrical contacts at the spindle, the accessory further including a circuit for determining the orientation of the contacts of the shank relative to complementary contacts at the spindle.

2. A machine tool accessory as claimed in claim 1 wherein the spindle is rotatable about an axis and wherein the shank of the accessory is attachable to the spindle in any orientation about the axis.

3. A machine tool accessory as claimed in claim 2 wherein the number of contacts at the shank is greater than the number of complementary contacts at the spindle.

4. A machine tool accessory as claimed in claim 1 wherein the circuit comprises a plurality of multi-way switches, switchable to route a contact appropriately.

5. A machine tool accessory as claimed in claim 4 wherein the circuit includes a voltage or current detection device for detecting the presence of voltage across the contacts or for detecting current flowing through the contacts and for causing the appropriate switching of the switches.

6. A machine tool accessory as claimed in claim 4 wherein the circuit is operable to detect impedance across the complementary contacts.

7. A machine tool accessory as claimed in claim 1 wherein the contacts provide a route for power and signal to/from the accessory.

8. A machine tool accessory as claimed in claim 1 wherein the circuit is powered by a power supply from the contacts.

9. A machine tool accessory as claimed in claim 1 wherein the contacts comprise at least three contacts.

10. A machine tool accessory as claimed in claim 1 wherein the shank comprises a male taper and the contacts are disposed on or adjacent the taper.

11. A machine tool comprising a stationary part;
a rotatable spindle;
and a machine tool accessory having a shank;
the spindle having a shank receiving area for releasably accepting in a plurality of orientations the shank of the machine tool accessory;
the machine tool further comprising a first electrical link between the stationary part and the spindle and a second electrical link between the spindle and the shank in the form of a plurality of electrical contacts at the shank and a plurality of complementary electrical contacts at the shank receiving area of the spindle, the contacts being arranged such that each is connectable to any one of the complementary contacts.

12. A machine tool as claimed in claim 11 wherein the machine tool accessory includes shank for releasably attaching the accessory to a spindle of a machine tool, the shank being attachable to the spindle in a plurality of orientations and having electrical contacts for electrical communication with complementary electrical contacts at the spindle, the accessory further including a circuit for determining the orientation of the contacts of the shank relative to complementary contacts at the spindle.

13. A machine tool as claimed in claim 12 wherein a liquid seal is provided between the shank and the spindle.

* * * * *